US009076604B2

(12) United States Patent
Huang et al.

(10) Patent No.: US 9,076,604 B2
(45) Date of Patent: Jul. 7, 2015

(54) TOUCH PANEL, A TOUCH DEVICE, AND A METHOD FOR DETERMINING A LOCATION OF A TOUCH POINT

(71) Applicant: Innolux Corporation, Miao-Li County (TW)

(72) Inventors: Yin-Hsiu Huang, Miao-Li County (TW); Chun-Hung Huang, Miao-Li County (TW); Chia-Yuan Wu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 154 days.

(21) Appl. No.: 13/888,436

(22) Filed: May 7, 2013

(65) Prior Publication Data

US 2013/0300691 A1    Nov. 14, 2013

(30) Foreign Application Priority Data

May 10, 2012 (TW) .............................. 101116683 A (51) Int. Cl.
*G06F 3/041* (2006.01)
*H01H 1/12* (2006.01)
*G06F 3/044* (2006.01)

(52) U.S. Cl.
CPC .............. *H01H 1/12* (2013.01); *G06F 3/0416* (2013.01); *G06F 3/044* (2013.01)

(58) Field of Classification Search
None
See application file for complete search history.

(56) References Cited

U.S. PATENT DOCUMENTS

| 2010/0149126 | A1* | 6/2010 | Futter | 345/174 |
| 2011/0012865 | A1* | 1/2011 | Nozawa | 345/174 |
| 2011/0025352 | A1* | 2/2011 | Pan et al. | 324/699 |
| 2011/0216017 | A1* | 9/2011 | Chou et al. | 345/173 |
| 2012/0097514 | A1* | 4/2012 | Ku et al. | 200/512 |
| 2012/0098760 | A1* | 4/2012 | Chuang | 345/173 |
| 2012/0162134 | A1* | 6/2012 | Chen et al. | 345/174 |
| 2013/0201118 | A1* | 8/2013 | Liu | 345/173 |

FOREIGN PATENT DOCUMENTS

TW             201108055 A      3/2011

OTHER PUBLICATIONS

TW Search Report dated Jun. 24, 2014.
English translation of TW Search Report dated Jun. 24, 2014.

* cited by examiner

*Primary Examiner* — Alexander Eisen
*Assistant Examiner* — Kebede Teshome
(74) *Attorney, Agent, or Firm* — McClure, Qualey & Rodack, LLP (57) ABSTRACT

A touch panel includes a substrate, first and second electrode units, and an auxiliary electrode unit. The substrate has first and second touch areas. The first electrode unit includes a plurality of first electrodes arranged spacedly in one of rows and columns, and disposed on the substrate to span the first and second touch areas. The second electrode unit includes a plurality of second electrodes arranged spacedly in the other of rows and columns to intersect without contacting the first electrodes. The auxiliary electrode unit is disposed proximate to and without contacting the second electrode unit such that the second electrode unit is able to detect a signal passing through the auxiliary electrode unit.

5 Claims, 8 Drawing Sheets

TOUCH PANEL, A TOUCH DEVICE, AND A METHOD FOR DETERMINING A LOCATION OF A TOUCH POINT

CROSS-REFERENCE TO RELATED APPLICATION

This application claims priority of Taiwanese application no. 101116683, filed on May 10, 2012.

BACKGROUND OF THE INVENTION

1. Field of the Invention

This disclosure relates to a touch display technology, more particularly to a touch panel, a touch device, and a method for determining a location of a touch point that are capable of reducing the number of connection pins required.

2. Description of the Related Art

Figure 1:
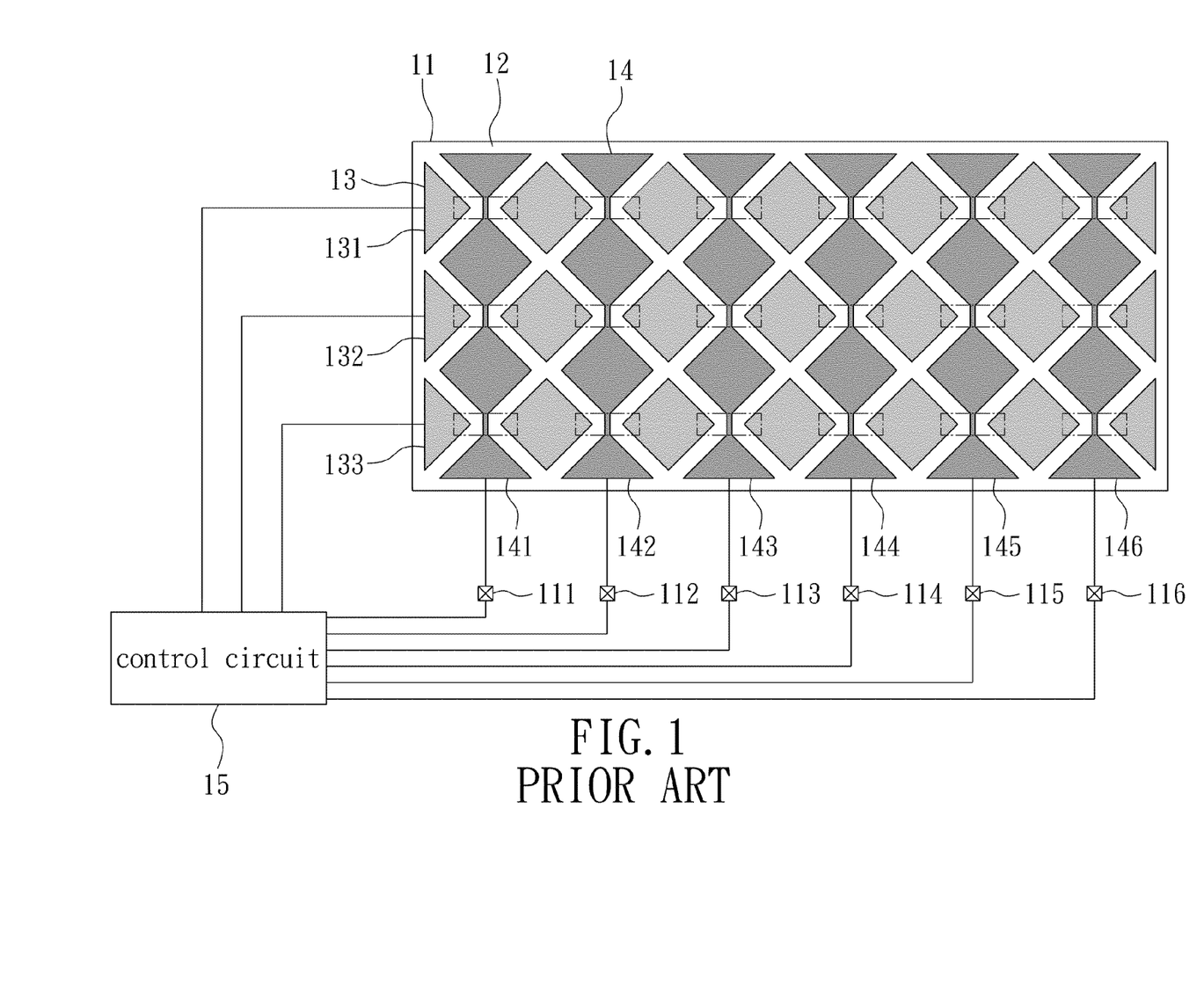
FIG. 1 is a schematic diagram of a conventional touch device.

FIG. 1 shows a conventional touch device that includes a touch panel 11 and a control circuit 15.

The touch panel 11 includes a substrate 12, a first electrode unit 13, and a second electrode unit 14. The first electrode unit 13 includes a plurality of first electrodes 131 to 133, which are disposed on the substrate 12 and arranged spacedly in rows. The second electrode unit 14 includes a plurality of second electrodes 141 to 146, which are disposed on the substrate 12 and arranged spacedly in columns to intersect without contacting the first electrodes 131 to 133. The second electrodes 141 to 146 are electrically and respectively connected to a plurality of output pins 111 to 116.

The control circuit 15 is connected electrically to the first electrodes 131 to 133, and is further connected electrically to the second electrodes 141 to 146 through the output pins 111 to 116. The control circuit 15 provides a driving signal to the first electrodes 131 to 133 by turns and detects signal variations on the second electrodes 141 to 146 for determining a location of a touch point on the touch panel 11.

Due to the growing size and resolution of current touch panels, the numbers of the first electrodes 131 to 133 and of the second electrodes 141 to 146 are also increasing. This means that the number of the output pins 111 to 116 of the touch panel 11 is increasing as well.

Therefore, the number and surface area of the conductive wires for connecting the touch panel 11 and the control circuit 15 are also increasing, in turn increasing the number of connection pins required in the control circuit 15, and resulting in an increasing manufacturing cost of the control circuit 15.

SUMMARY OF THE INVENTION

Therefore, the object of the present disclosure is to provide a touch panel, a touch device and a method that can overcome the aforesaid drawbacks of the prior art.

According to one aspect of this disclosure, a touch panel includes a substrate, a first electrode unit, a second electrode unit and an auxiliary electrode unit. The substrate has a first touch area and a second touch area. The first electrode unit includes a plurality of first electrodes that are arranged spacedly in one of rows and columns, and that are disposed on the substrate to span the first and second touch areas. The second electrode unit includes a plurality of second electrodes that are arranged spacedly in the other of rows and columns to intersect without contacting the first electrodes. The second electrodes includes a plurality of first sensing electrodes that are disposed on the first touch area of the substrate, and a plurality of second sensing electrodes that are disposed on the second touch area of the substrate. Each pair of the first and second sensing electrodes are electrically connected.

The auxiliary electrode unit includes a first auxiliary electrode disposed on the first touch area of the substrate, and a second auxiliary electrode disposed on the second touch area of the substrate and spaced apart from the first auxiliary electrode. The first auxiliary electrode is disposed proximate to and without contacting the first sensing electrodes such that each of the first sensing electrodes is able to detect a signal passing through the first auxiliary electrode. The second auxiliary electrode is disposed proximate to and without contacting the second sensing electrodes such that each of the second sensing electrodes is able to detect a signal passing through the second auxiliary electrode.

According to another aspect of this disclosure, a method for determining a location of a touch point on the touch panel as described previously includes the steps of:

(A) providing a driving signal to the first and second auxiliary electrodes by turns, and detecting, in each turn, a signal on each of the second electrodes;

(B) with reference to the result of detection in step (A), determining which one of the first and second touch areas the touch point is located at;

(C) providing a driving signal to the first electrodes by turns, and detecting, in each turn, signals on the second electrodes;

(D) with reference to the result of detection in step (C), determining which one of the first electrodes, which one of the first sensing electrodes and which one of the second sensing electrodes the touch point may correspond; and (E) with reference to the determinations made in steps (B) and (D), determining the location of the touch point in terms of a coordinate represented by one of the first electrodes and one of the first and second sensing electrodes.

According to still another aspect of this disclosure, a touch device includes the touch panel as described previously and a control unit coupled electrically to the touch panel. The touch device performs the method for determining a location of a touch point on the touch panel.

BRIEF DESCRIPTION OF THE DRAWINGS

Other features and advantages of the present disclosure will become apparent in the following detailed description of the preferred embodiments of this disclosure, with reference to the accompanying drawings, in which.

DETAILED DESCRIPTION OF THE PREFERRED EMBODIMENTS

Before the present disclosure is described in greater detail with reference to the preferred embodiments, it should be noted that the same reference numerals are used to denote the same elements throughout the following description.

Figure 2:
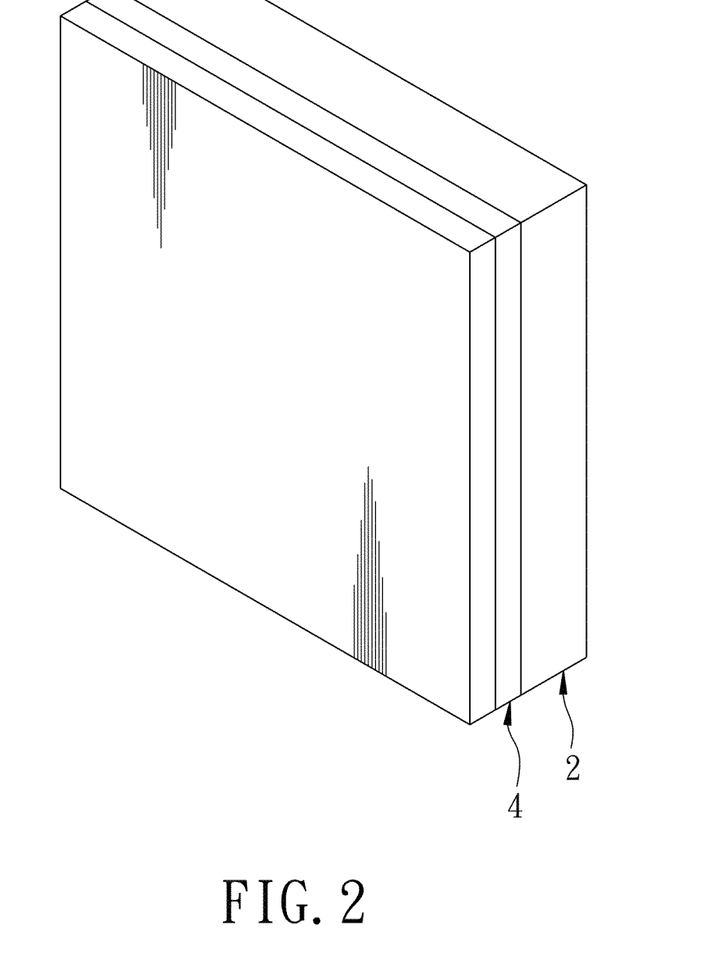
FIG. 2 is a schematic perspective view of a first preferred embodiment of a touch device according to this disclosure.
Figure 3:
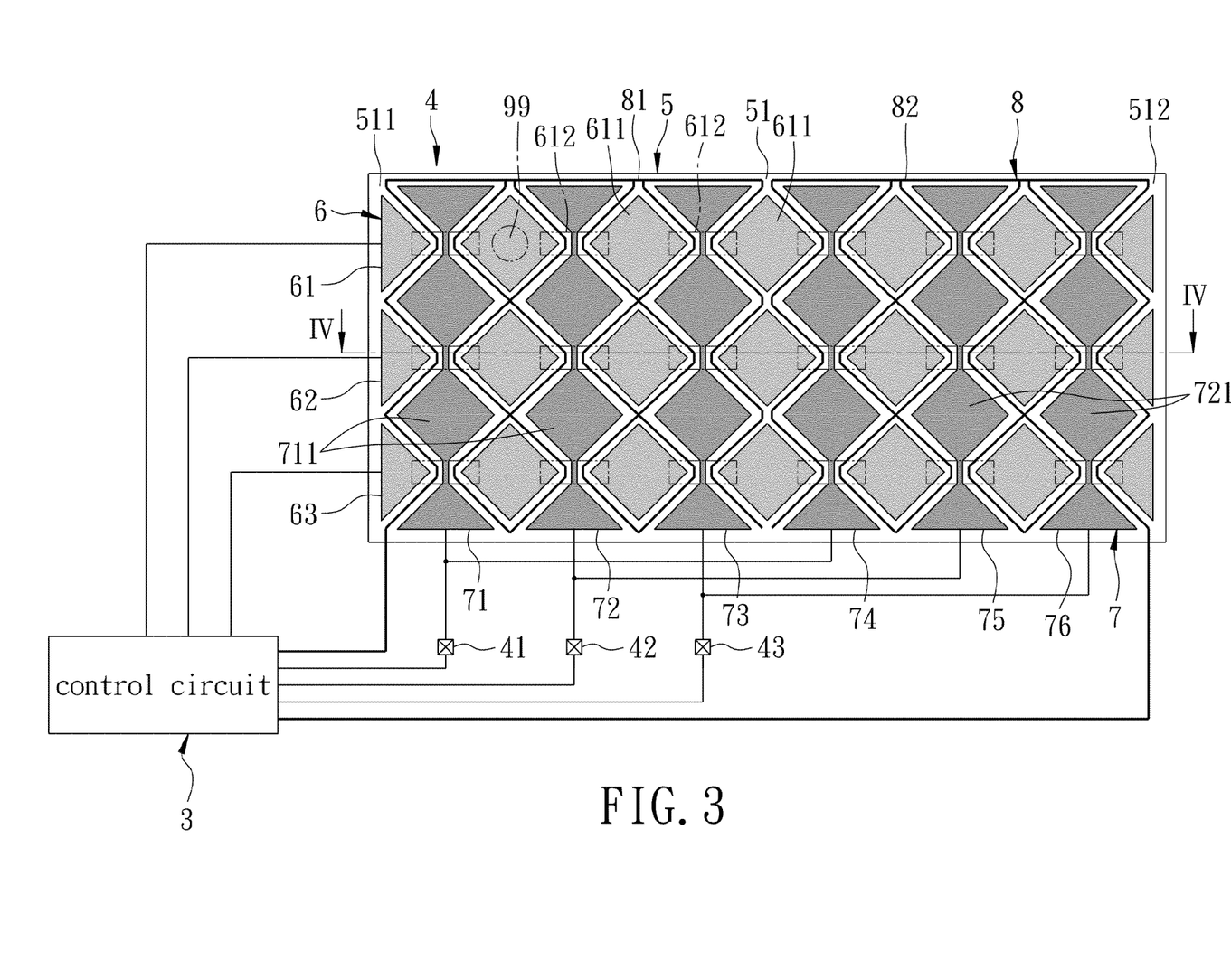
FIG. 3 is a schematic diagram of a touch panel and a control circuit of the first preferred embodiment.
Figure 4:
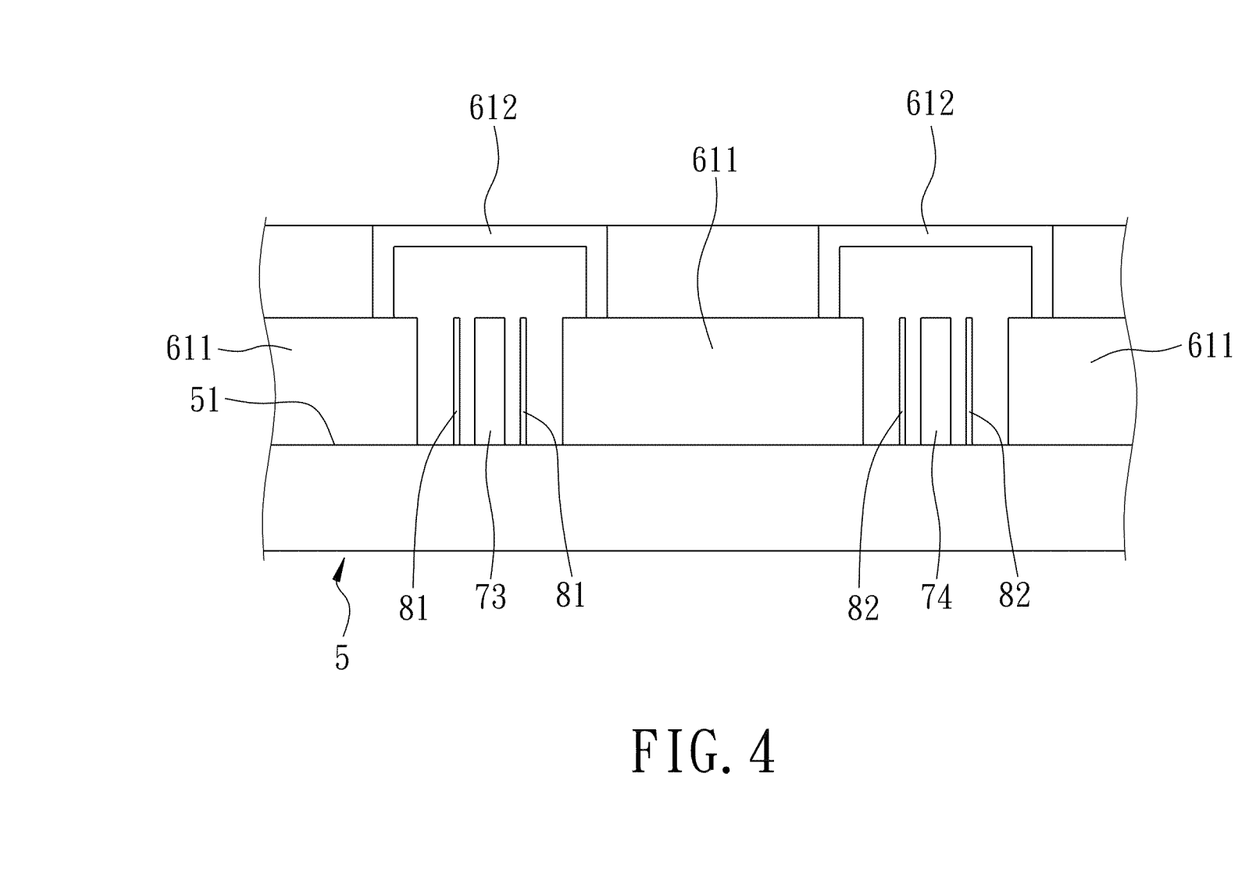
FIG. 4 is a fragmentary sectional view of the touch panel of the first preferred embodiment.

FIGS. 2 to 4 show a first preferred embodiment of a touch device according to this disclosure. The touch device includes a display panel 2, a control circuit 3, and a touch panel 4. The display panel 2 is well known to the skill in the art, and detailed descriptions related thereto will be omitted herein for the sake of brevity.

The display panel 2 is disposed beneath or behind the touch panel 4 for displaying a visual display thereon to be viewed through the touch panel 4. The touch panel 4 is electrically connected to the control circuit 3 and includes a substrate 5, a first electrode unit 6, a second electrode unit 7, and an auxiliary electrode unit 8. The substrate 5 has a first touch area 511 and a second touch area 512 that are both formed on one side 51 of the substrate 5. In this embodiment, the first touch area 511 and the second touch area 512 are equal in size and are disposed next to each other on the side 51. It should be noted that the first and second touch areas 511, 512 are not limited to be equal in size, and may be disposed in other arrangements. The substrate 5 may have more than two touch areas. In this embodiment, the substrate 5 is made of glass but may also be made of other transparent materials.

The first electrode unit 6 includes a plurality of first electrodes 61 to 63 that are arranged spacedly in rows, that are electrically connected to the control circuit 3, and that are disposed on the substrate 5 to span the first and second touch areas 511, 512. Each of the first electrodes 61 to 63 includes a plurality of electrode members 611 and a plurality of bridge members 612. Each of the bridge members 612 is electrically connected between a corresponding adjacent pair of the electrode members 611. in this embodiment, most of the electrode members 611 are rhombus in shape, with the exception of the outermost ones of the electrode members 611, which are triangular in shape.

The second electrode unit 7 includes a plurality of second electrodes 71 to 76 that are arranged spacedly in columns to intersect without contacting the first electrodes 61 to 63. The second electrodes 71 to 76 include a plurality of first sensing electrodes 71 to 73 that are disposed on the first touch area 511 of the substrate 5, and a plurality of second sensing electrodes 74 to 76 that are disposed on the second touch area 512 of the substrate 5. Each pair of the first and second sensing electrodes 71 to 73, 74 to 76 are electrically connected to the control circuit 3 through a plurality of connection pins 41 to 43. Each of the first sensing electrodes 71 to 73 includes a plurality of electrode members 711 that are electrically coupled with each other. Each of the second sensing electrodes 74 to 76 includes a plurality of electrode members 721 and that are electrically coupled with each other. In this embodiment, most of the electrode members 711, 721 are rhombus in shape, with the exception of the outermost ones of the electrode members 711, 721, which are triangular in shape.

It should be noted herein that the first electrodes 61 to 63 may be arranged in columns, while the second electrodes 71 to 76 are arranged in rows in other embodiments of this disclosure.

In this embodiment, the first and second electrode units 6, 7 are in the form of transparent conductive layers, which are made of indium tin oxide (ITO) or other materials with similar characteristics.

The auxiliary electrode unit 8 includes a first auxiliary electrode 81 and a second auxiliary electrode 82, both of which are electrically connected to the control circuit 3. The first auxiliary electrode 81 is disposed on the first touch area 511 of the substrate 5 and extends in a path that substantially corresponds to the contours of the first sensing electrodes 71-73. The second auxiliary electrode 82 is disposed on the second touch area 512 of the substrate 5, extends in a path that substantially corresponds to the contours of the second sensing electrodes 74 to 76, and is spaced apart from the first auxiliary electrode 81. The first auxiliary electrode 81 is disposed proximate to and without contacting the first sensing electrodes 71 to 73 such that each of the first sensing electrodes 71 to 73 is able to detect a signal passing through the first auxiliary electrode 81. The second auxiliary electrode 82 is disposed proximate to and without contacting the second sensing electrodes 74 to 76 such that each of the second sensing electrodes 74 to 76 is able to detect a signal passing through the second auxiliary electrode 82.

In this embodiment, the first and second auxiliary electrodes 81, 82 are in the form of conductive traces, but may also be in the form of indium tin oxide (ITO) transparent conductive layers or made of other similar materials in other embodiments of this disclosure.

Figure 5:
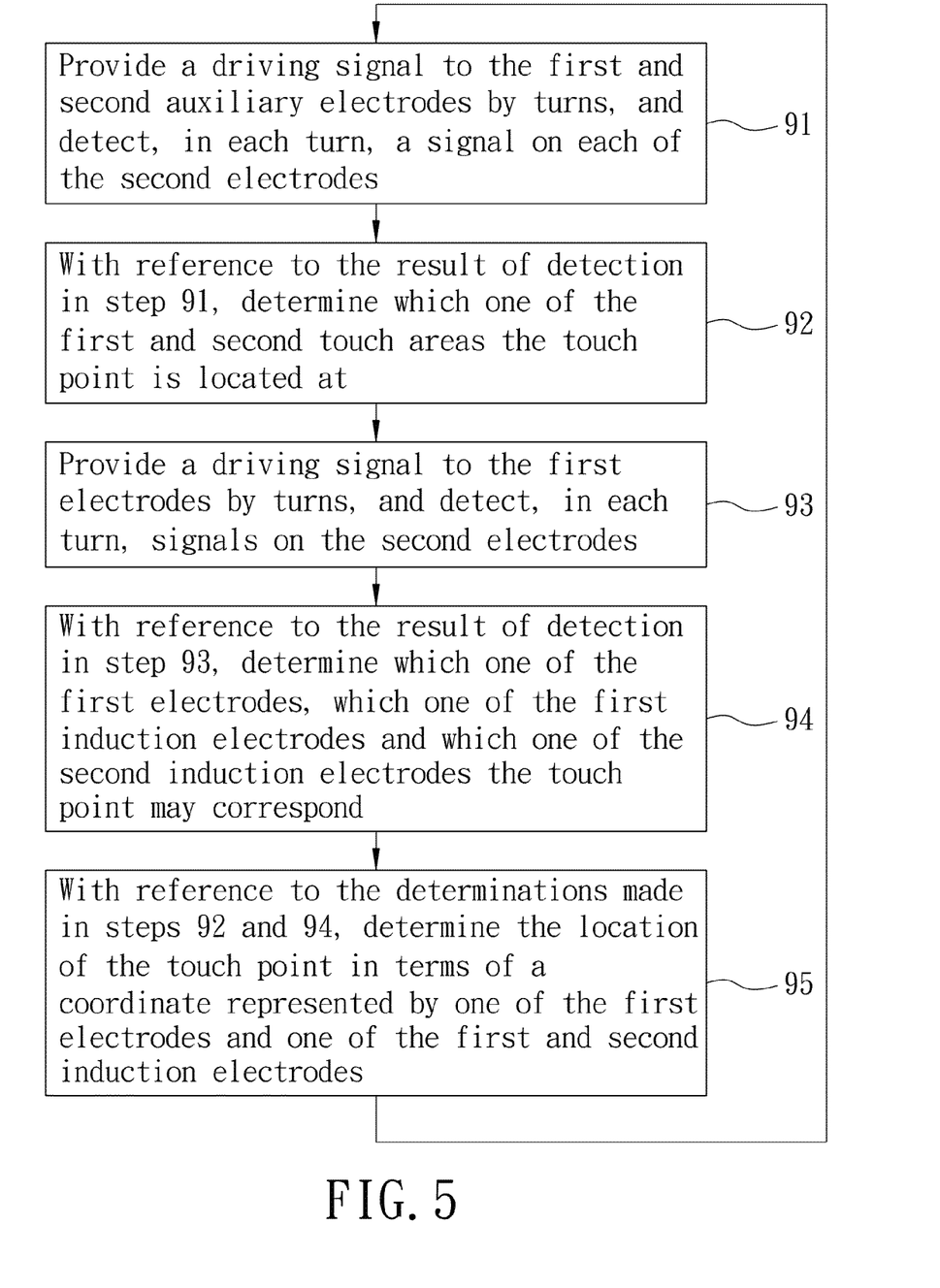
FIG. 5 is a flowchart illustrating a method for determining a location of a touch point in the first preferred embodiment.

Referring to FIGS. 3 and 5, a method for determining a location of a touch point 99 on the touch panel 4 as executed by the control circuit 3 will be explained. The method includes steps 91 to 95. In step 91, the control circuit 3 provides a driving signal to the first and second auxiliary electrodes 81, 82 by turns and detects, in each turn, a signal on each of the second electrodes 71 to 76. In this embodiment, the control circuit 3 provides the driving signal to the first auxiliary electrode 81 first, and detects the signal on each of the second electrodes 71 to 76, and then provides the driving signal to the second auxiliary electrode 82 and detects the signal on each of the second electrodes 71 to 76. However, the control circuit 3 can also provides a driving signal to the second auxiliary electrode 82 first instead of the first auxiliary electrode 81.

In step 92, the control circuit 3 refers to the result of detection in step 91 for determining which one of the first and second touch areas 511, 512 the touch point 99 is located at. In this embodiment, the control circuit 3 determines whether the touch point 99 is located at the first touch area 511 with reference to the result of detection obtained when the driving signal is provided to the first auxiliary electrode 81. The control circuit 3 determines whether the touch point 99 is located at the second touch area 512 with reference to the result of detection obtained when the driving signal is provided to the second auxiliary electrode 82.

In step 93, the control circuit 3 provides a driving signal to the first electrodes 61 to 63 by turns, and detects, in each turn, signals on the second electrodes 71 to 76. In this embodiment, the control circuit 3 provides the driving signal to the first electrode 61 and detects the signal on each of the second electrodes 71 to 76 first, and then provides the driving signal to the first electrode 62 and detects the signal on each of the second electrodes 71 to 76, and finally provides the driving signal to the first electrode 63 and detects the signal on each of the second electrodes 71 to 76. It should be noted that the order of providing the driving signals to the first electrodes 61 to 63 is not limited to that mentioned above.

In step 94, the control circuit 3 refers to the result of detection in step 93 for determining which one of the first electrodes 61 to 63, which one of the first sensing electrodes 71 to 73 and which one of the second sensing electrodes 74 to 76 the touch point may correspond.

In step 95, the control circuit 3 refers to the determinations made in steps 92 and 94 for determining the location of the touch point 99 in terms of a coordinate represented by one of the first electrodes 61 to 63 and one of the first and second sensing electrodes 71 to 76. For example, if it is determined by the control circuit 3 in step 92 that the touch point 99 is located at the first touch area 511, and in step 94 that the touch point 99 is corresponds to the first electrode 61, the first sensing electrode 71, and the second sensing electrodes 74, then, the location of the touch point 99 on the touch panel 4 will be determined in step 95 to be at the first electrode 61 and the first sensing electrode 71 through combining the results of the determinations in steps 92 and 94. It should be noted that steps 93 and 94 may be performed prior to steps 91 and 92. In this embodiment, each of the driving signals is a pulsed voltage signal, but may also be implemented by other types of current or voltage signals in other embodiments of this disclosure.

To sum up, the advantages of this embodiment according to this disclosure are as follows:

With the provision of the first and second auxiliary electrodes 81, 82, and through connecting the first and second sensing electrodes 71 to 73, 74 to 76 in pairs, the number of the connection pins 41 to 43 required is reduced by half as compared to the conventional touch panel, and the number and surface area of the conductive wires for connecting to the control circuit 3 are also reduced, thereby saving manufacturing costs.

Figure 6:
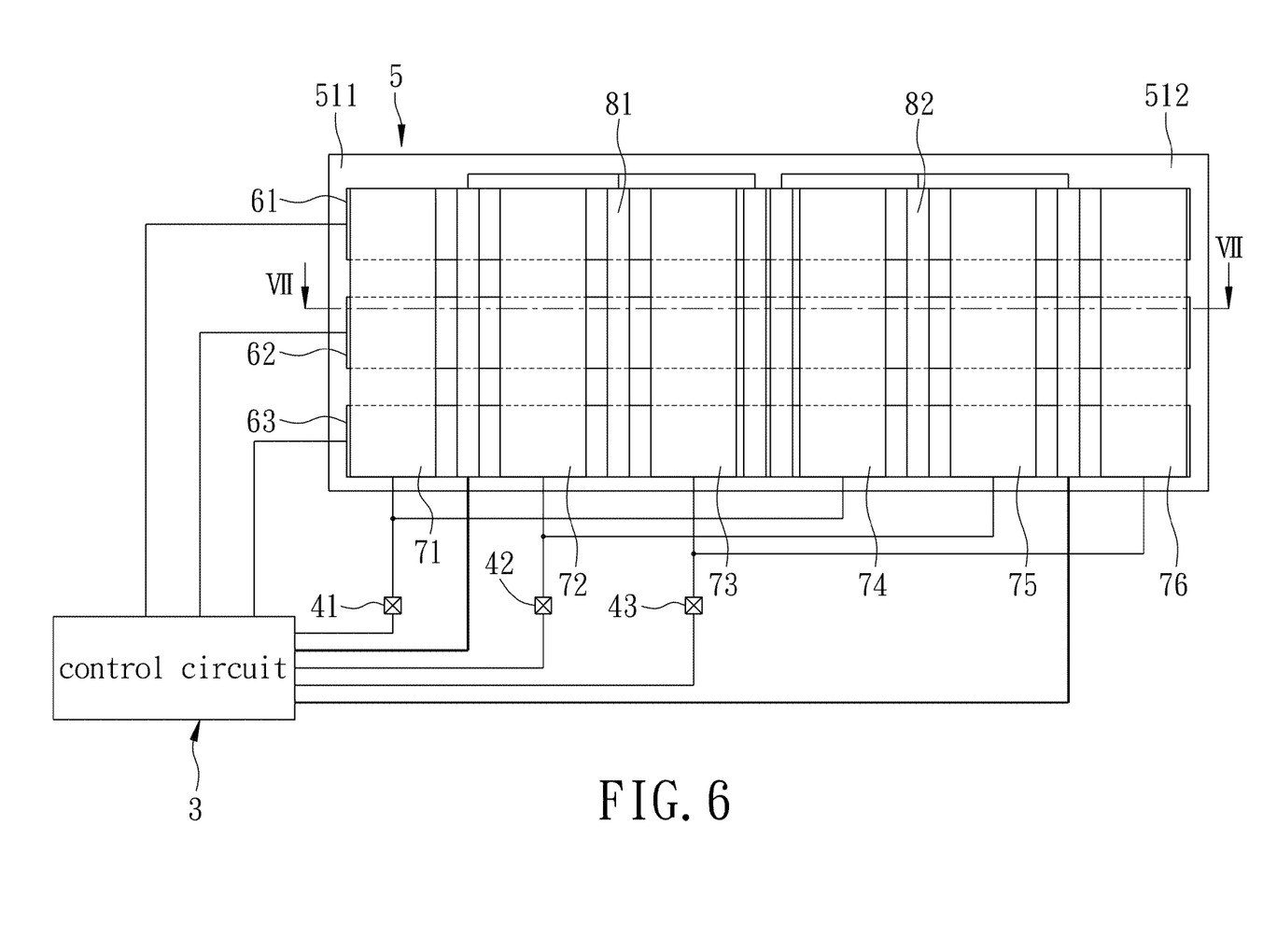
FIG. 6 is a schematic diagram of a touch panel and a control circuit of a touch device according to a second preferred embodiment of this disclosure.
Figure 7:
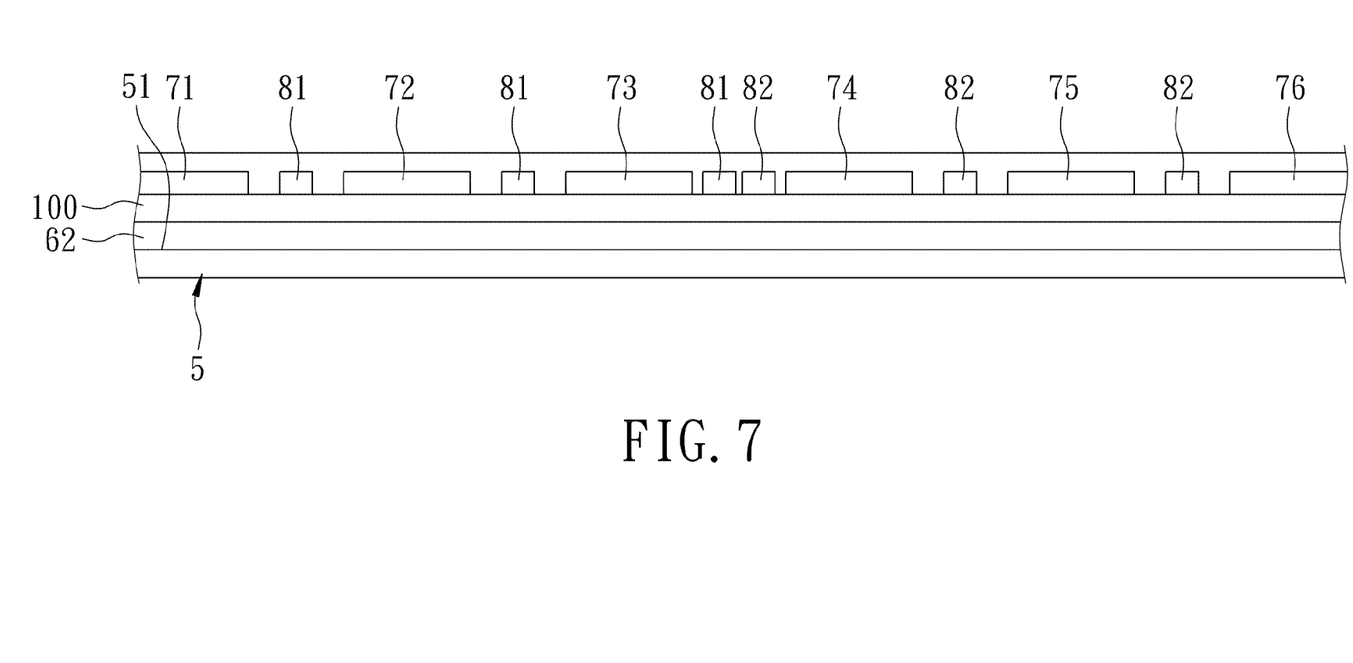
FIG. 7 is a sectional view of the touch panel of the second preferred embodiment.

FIGS. 6 and 7 show a second preferred embodiment of a touch device according to this disclosure. The second preferred embodiment is similar to the first preferred embodiment, and only differs therefrom in that each of the first and second electrodes 61 to 63, 71 to 76 has an elongated shape, and that a dielectric layer 100 is disposed between the first and second electrodes 61 to 63, 71 to 76 so as to separate the first electrodes 61 to 63 from the second electrodes 71 to 76. The first auxiliary electrode 81, the second auxiliary electrode 82, and the second electrodes 71 to 76 are disposed on the same side of the dielectric layer 100. The first auxiliary electrode 81, the second auxiliary electrode 82, the second electrodes 71 to 76, and the first electrodes 61 to 63 are all disposed on the same side 51 of the substrate 5.

Figure 8:
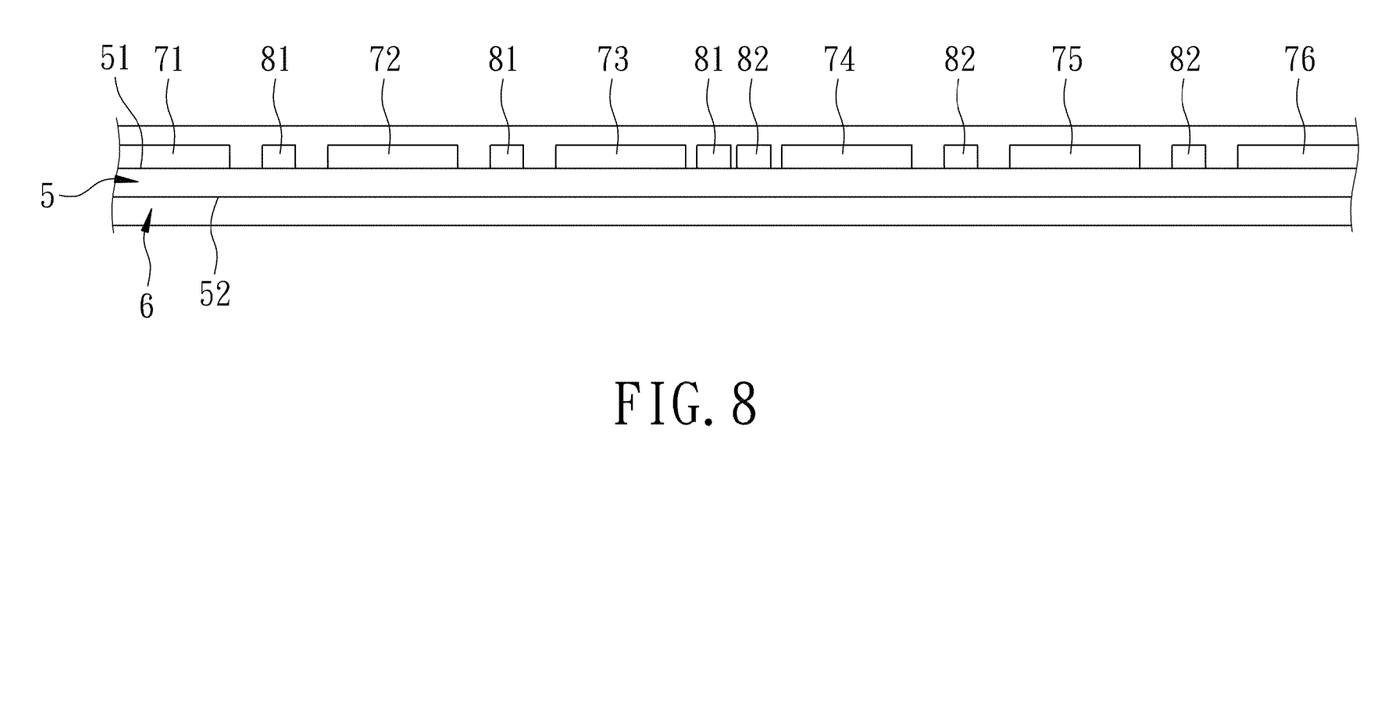
FIG. 8 is a sectional view of the touch panel of a third preferred embodiment of this disclosure.

Referring to FIGS. 6 and 8, a third preferred embodiment of a touch device according to this disclosure is similar to the second preferred embodiment and differs therefrom in that the first auxiliary electrode 81, the second auxiliary electrode 82, and the second electrodes 71 to 76 are disposed on the side 51 of the substrate 5, and the first electrodes 61 to 63 are disposed on the other side 52 of the substrate 5 opposite to the side 51.

According to the present disclosure, the number of connection pins of the touch panel 4 and the number of conductive wires required for connecting the touch panel 4 and the control circuit 3 can be reduced.

While the present disclosure has been described in connection with what are considered the most practical and preferred embodiments, it is understood that this disclosure is not limited to the disclosed embodiments but is intended to cover various arrangements included within the spirit and scope of the broadest interpretation and equivalent arrangements.

What is claimed is:

1. A touch device comprising:
a touch panel comprising:
a substrate having a first touch area and a second touch area;
a first electrode unit including a plurality of first electrodes arranged spacedly in one of rows and columns, and disposed on said substrate to span said first and second touch areas;
a second electrode unit including a plurality of second electrodes that are arranged spacedly in the other of rows and columns to intersect without contacting said first electrodes, said second electrodes including a plurality of first sensing electrodes that are disposed on said first touch area of said substrate, and a plurality of second sensing electrodes that are disposed on said second touch area of said substrate, each pair of said first and second sensing electrodes being electrically connected; and
an auxiliary electrode unit including a first auxiliary electrode disposed on said first touch area of said substrate, and a second auxiliary electrode disposed on said second touch area of said substrate and spaced apart from said first auxiliary electrode, said first auxiliary electrode being disposed proximate to and without contacting said first sensing electrodes such that each of said first sensing electrodes is able to detect a signal passing through said first auxiliary electrode, said second auxiliary electrode being disposed proximate to and without contacting said second sensing electrodes such that each of said second sensing electrodes is able to detect a signal passing through said second auxiliary electrode; and
a control unit coupled electrically to said touch panel, and performing a method for determining a location of a touch point on said touch panel, the method comprising the steps of:
(A) providing a driving signal to the first and second auxiliary electrodes by turns, and detecting, in each turn, signals on the second electrodes;
(B) with reference to the result of detection in step (A), determining which one of the first and second touch areas the touch point is located at;
(C) providing a driving signal to the first electrodes by turns, and detecting, in each turn, signals on the second electrodes;
(D) with reference to the result of detection in step (C), determining which one of the first electrodes, which one of the first sensing electrodes and which one of the second sensing electrodes the touch point may correspond; and
(E) with reference to the determinations made in steps (B) and (D), determining the location of the touch point in terms of a coordinate represented by one of the first electrodes and one of the first and second sensing electrodes.

2. The touch device as claimed in claim 1, further comprising a display panel disposed beneath said touch panel for displaying a visual display thereon to be viewed through said touch panel.

3. The touch device as claimed in claim 1, wherein said first auxiliary electrode of said touch panel extends in a path that substantially corresponds to the contours of said first sensing electrodes, and said second auxiliary electrode of said touch panel extends in a path that substantially corresponds to the contours of said second sensing electrodes.

4. A method for determining a location of a touch point on a touch panel, the touch panel comprising:
a substrate having a first touch area and a second touch area;
a first electrode unit including a plurality of first electrodes arranged spacedly in one of rows and columns, and disposed on said substrate to span said first and second touch areas;
a second electrode unit including a plurality of second electrodes that are arranged spacedly in the other of rows and columns to intersect without contacting said first electrodes, said second electrodes including a plurality of first sensing electrodes that are disposed on said first touch area of said substrate, and a plurality of second sensing electrodes that are disposed on said second touch area of said substrate, each pair of said first and second sensing electrodes being electrically connected; and an auxiliary electrode unit including a first auxiliary electrode disposed on said first touch area of said substrate, and a second auxiliary electrode disposed on said second touch area of said substrate and spaced apart from said first auxiliary electrode, said first auxiliary electrode being disposed proximate to and without contacting said first sensing electrodes such that each of said first sensing electrodes is able to detect a signal passing through said first auxiliary electrode, said second auxiliary electrode being disposed proximate to and without contacting said second sensing electrodes such that each of said second sensing electrodes is able to detect a signal passing through said second auxiliary electrode;

the method comprising the steps of:

(A) providing a driving signal to the first and second auxiliary electrodes by turns, and detecting, in each turn, signals on the second electrodes;

(B) with reference to the result of detection in step (A), determining which one of the first and second touch areas the touch point is located at;

(C) providing a driving signal to the first electrodes by turns, and detecting, in each turn, signals on the second electrodes;

(D) with reference to the result of detection in step (C), determining which one of the first electrodes, which one of the first sensing electrodes and which one of the second sensing electrodes the touch point may correspond; and (E) with reference to the determinations made in steps (B) and (D), determining the location of the touch point in terms of a coordinate represented by one of the first electrodes and one of the first and second sensing electrodes.

5. The method for determining location of touch point as claimed in claim 4, wherein each of the driving signals is a pulsed voltage signal.

* * * * *